June 19, 1951   A. GAZDA   2,557,220
SAFETY DEVICE FOR ROTATIVE SUSTAINING MEANS
Filed April 26, 1945

Inventor
Antoine Gazda,

Attorney

Patented June 19, 1951

2,557,220

UNITED STATES PATENT OFFICE 2,557,220

SAFETY DEVICE FOR ROTATIVE SUSTAINING MEANS

Antoine Gazda, Providence, R. I.

Application April 26, 1945, Serial No. 590,405

6 Claims. (Cl. 170—160.59)

This invention relates to a safety device for rotative sustaining means, and more particularly to a safety device for rotor blades of aircraft of the helicopter type.

It has been found that serious results may follow from the accidental rupture of rotor blades of aircraft of the helicopter type in consequence of the severe strains to which such blades are exposed when in operation. Not only does such rupture seriously impair or totally destroy the effective sustaining value of the rotor blade, but centrifugal force due to the rotation of the blade may wholly detach the broken end of the blade and hurl it through the air.

A primary object of the present invention is the development of a novel relationship of parts in a sustaining rotor blade construction which will obviate the aforedescribed deficiencies of the prior art constructions.

To this end, briefly stated, the rotor blade is provided with means, which may preferably assume the form of a tie, extending through the entire length of the blade, preferably through a rigid spar housing or the like. In one embodiment, the tie may be a flexible member which is subjected to tension at one end thereof. In this way, even if a break should occur in the blade during operation thereof, the tensioned tie acts to hold the parts together in operative relationship and against undesired detachment. In a most simplified embodiment, the aforesaid means may be a simple tie member, and tensioning means may be omitted, if desired.

The foregoing and other objects and advantages of the invention which will be manifest from the detailed description hereinafter set forth, are realized by the relationship of parts according to the present improvements. The latter are illustrated, by way of presently-preferred exemplary embodiments, on the accompanying sheet of drawings, and are described in the following description.

Figure 1:
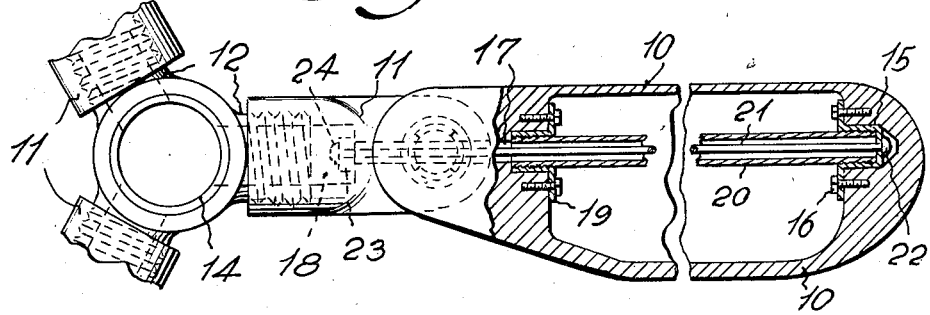
Fig. 1 is a fragmentary view partly in plan and partly in section of one form of construction according to the invention.

Referring first to Fig. 1 of the drawing, reference numeral 10 designates a hollow rotor blade, the exterior of which is of conventional airfoil configuration. Blade 10 is pivotally mounted, in essentially conventional forked manner, on the hinge member 11 which, in turn, is threadedly mounted on threaded boss 12 projecting from the top of the sleeve 13 secured to the upper end of the hub 14 of the rotor blade assembly. Hub 14 is mounted for rotation in essentially conventional manner (not shown).

The outer end of the blade 10 may be interiorly recessed, as shown in Fig. 1, to receive a flanged and internally threaded socket 15 secured by bolts 16 or the like. The inner end of blade 10 may be provided with a central bore 17 extending therethrough and communicating at one end with the hollow interior of blade 10 and, at the other end, with a similar bore provided in hinge member 11. The latter bore terminates in an enlargement 18 substantially coextensive in diameter with the bore through sleeve 13. Secured in place in the outer end of bore 17 is a flanged sleeve 19.

Extending between and supported by socket 15 and sleeve 19 is a rigid metallic cylindrical spar or blade reinforcing member 20 which may be integrated with its supports in any suitable manner. Intermediate supports for the spar 20 may also be provided at spaced points along the length of blade 10.

Figure 7:
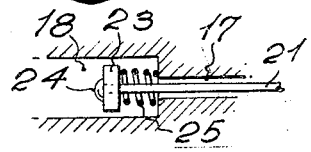
Fig. 7 is a fragmentary showing of a modified detail according to the invention.

Extending through spar 20 is a member 21 which, in the embodiment according to Fig. 1 is shown as a metallic tie of substantial diameter. The outer end of tie 21 is headed, as shown at 22, and head 22 bears against the outer surface of socket 15. The other or inner end of tie 21 is threaded and has a nut 23 screwed thereon tightly against the adjacent wall of enlargement 18. The extreme inner end of tie 21 may be upset, after the positioning of nut 23 thereon, to provide a retaining head 24. As shown in Fig. 7, tie 21 may be maintained under spring tension by means of helical spring 25 which is positioned between nut 23 and the adjacent wall of enlargement 18 and operates to urge the nut away from the wall. The tie 21 without the spring as shown in Fig. 1 is sufficiently flexible to allow some pivoting of the blade about the hinge member 11.

It will be clear that, with this relationship of parts, there can be no detachment of any part of the blade 10 even if a rupture should accidentally occur.

Figure 5:
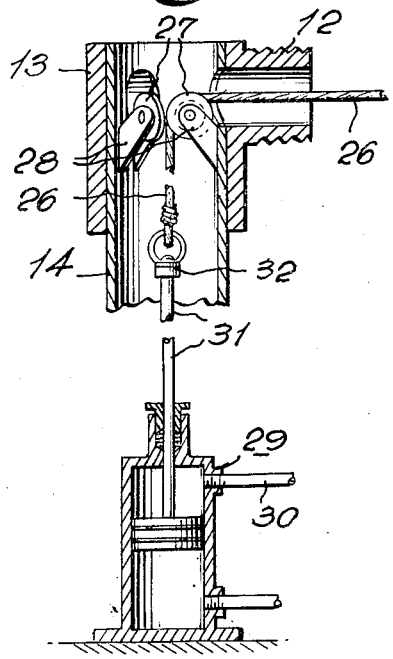
Fig. 5 is a fragmentary view, partly in section and partly in elevation through a further form of the invention, showing more particularly an arrangement of hub retention of the flexible tie.
Figure 6:
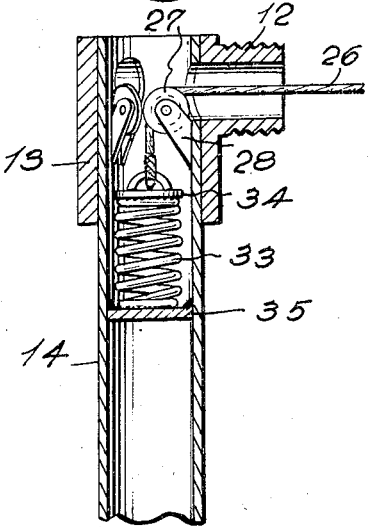
Fig. 6 shows a modification of the form of the invention according to Fig. 5.

In the embodiments according to Figs. 5 and 6, retention of the inner tie end is effected in the hub of the rotor blade assembly. The structure of the blades 10 and hinge members 11 in these embodiments is exactly the same as in the previously described embodiment. The tie member is somewhat modified, however, in that nut 23 and head 24 are omitted. The tie member, moreover, preferably takes the form of a flexible cable 26 which runs over a pulley 27 mounted on bracket 28, as shown, inside the hub 14. Tension on the cable is exerted, in this embodiment of the invention, by means of a piston and cylinder arrangement 29 positioned beneath the hub 14. Pressure fluid may be applied for this purpose through conduit 30. Piston rod 31 terminates in a swivel joint 32, i. e. member 32 is mounted for relative rotation but against relative axial displacement with respect to rod 31. The end of each cable 26 is secured to the loop of the joint 32.

In the modification according to Fig. 6, the cable 26 is maintained under tension by heavy duty spring 33 secured to plates 34 and 35 and operating to pull these two plates toward each other. Plate 35 is affixed to the hub 14. A loop is provided on plate 34 for the tying of tie members 26. It is understood, of course, that while but one tie member is shown in Figs. 5 and 6, three such tie members are provided, one for each blade.

Figure 2:
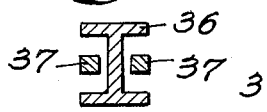
Fig. 2 is a cross-sectional view through an alternative arrangement of spar and flexible tie.
Figure 3:
Fig. 3 is a cross-sectional view through another form of spar and flexible tie arrangement.
Figure 4:
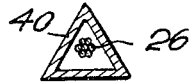
Fig. 4 is a cross-sectional view through still another embodiment of spar and flexible tie arrangement.

The spar and tie member relationship may assume a wide variety of forms, several of which are shown by way of illustration in Figs. 2, 3 and 4. In Fig. 2, the spar member 36 is an I-beam, which may be secured in the hollow chamber of blade 10 in any suitable and essentially conventional manner. Each I-beam may be associated with a pair of tie members 37 which, in contrast to tie members 21 and 26 which are essentially circular in cross section, are shown as of square cross section. Tie members 37 may be flexible and are secured, in suitable manner, at their respective ends to the interior of the blade tip and the tensioning means (e. g. means 33, 34, 35), if desired.

According to Fig. 3, the spar 38 is rectangular and the tie member is a flexible flat metallic strip 39. Finally, according to Fig. 4, a wire tie 26 may be housed in a triangular spar 40.

Having thus disclosed the invention, what is claimed is:

1. Rotative sustaining means for aircraft of the helicopter type comprising a rotative hub, a hollow rotor blade, a hinge member interconnecting said hub and blade, flexible tie means attached to the blade tip on the interior thereof and extending through to and beyond the other end of the blade, and means in said hinge member for maintaining said flexible tie means in constantly tensioned state.

2. Rotative sustaining means for aircraft of the helicopter type comprising a rotative hub, a hollow rotor blade, a hinge member interconnecting said hub and blade, flexible tie means attached to the blade tip on the interior thereof and extending through to and beyond the other end of the blade, and resilient means in said hinge member for maintaining said flexible tie means in constantly tensioned state.

3. Rotative sustaining means for aircraft of the helicopter type comprising a rotative hub, a hollow rotor blade, a hinge member interconnecting said hub and blade, flexible tie means attached to the blade tip on the interior thereof and extending through to and beyond the other end of the blade, and means in said hub for maintaining said flexible tie means in constantly tensioned state.

4. Rotative sustaining means for aircraft of the helicopter type comprising a rotative hub, a hollow rotor blade, a hinge member interconnecting said hub and blade, flexible tie means attached to the blade tip on the interior thereof and extending through to and beyond the other end of the blade, and pressure fluid-actuated means for maintaining said flexible tie means in constantly tensioned state.

5. Rotative sustaining means for aircraft of the helicopter type comprising a hub, a hollow rotor blade, flexible tie means attached at one end to the blade tip on the interior thereof and extending through to and beyond the other end of the blade, means in said hub to which the other end of said tie means is secured and means for maintaining said flexible tie means in constantly tensioned state.

6. Rotative sustaining means for aircraft of the helicopter type comprising a rotative hub, a hollow rotor blade, a hinge member interconnecting said hub and blade, flexible tie means attached to the blade tip on the interior thereof and extending through to and beyond the other end of the blade, and resilient means secured to said hub and connected to said tie means for maintaining said flexible tie means in constantly tensioned state.

ANTOINE GAZDA.

REFERENCES CITED

The following references are of record in the file of this patent:

UNITED STATES PATENTS

| Number | Name | Date |
|---|---|---|
| 1,380,057 | Gove | May 31, 1921 |
| 1,884,598 | Cierva | Oct. 25, 1932 |
| 1,922,866 | Rosenberg | Aug. 15, 1933 |
| 2,047,776 | Hafner | July 14, 1936 |
| 2,163,481 | Cameron | June 20, 1939 |
| 2,362,301 | Pecker | Nov. 7, 1944 |

FOREIGN PATENTS

| Number | Country | Date |
|---|---|---|
| 385,074 | Great Britain | Dec. 22, 1932 |